United States Patent
Siegel et al.

(10) Patent No.: US 9,645,640 B2
(45) Date of Patent: May 9, 2017

(54) DEVICE AND METHOD FOR NAVIGATING WITHIN A MENU FOR CONTROLLING A VEHICLE, AND SELECTING A MENU ENTRY FROM THE MENU

(71) Applicant: AUDI AG, Ingolstadt (DE)

(72) Inventors: Andreas Siegel, Ingolstadt (DE); Michael Reichel, Ingolstadt (DE); Peter Bargfrede, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/102,798

(22) PCT Filed: Dec. 16, 2014

(86) PCT No.: PCT/EP2014/003380
§ 371 (c)(1),
(2) Date: Jun. 8, 2016

(87) PCT Pub. No.: WO2015/090569
PCT Pub. Date: Jun. 25, 2015

(65) Prior Publication Data
US 2016/0313792 A1    Oct. 27, 2016

(30) Foreign Application Priority Data
Dec. 21, 2013 (DE) .......................... 10 2013 021 834

(51) Int. Cl.
*G06F 3/01* (2006.01)
*B60W 50/08* (2012.01)
(Continued)

(52) U.S. Cl.
CPC .............. *G06F 3/012* (2013.01); *B60K 35/00* (2013.01); *B60W 50/08* (2013.01); *B60W 50/10* (2013.01);
(Continued)

(58) Field of Classification Search
CPC .... B60K 2350/1004; B60K 2350/1096; B60K 2350/1076; B60K 2350/96–2350/965;
(Continued)

(56) References Cited

U.S. PATENT DOCUMENTS 9,021,395 B2 * 4/2015 Sakata ............. H04N 21/44218
715/811
9,094,655 B2 * 7/2015 Suzuki ..................... H04N 9/87
(Continued)

FOREIGN PATENT DOCUMENTS

DE    101 03 922 A1    8/2002
DE    101 31 720 A1    1/2003
(Continued)

OTHER PUBLICATIONS

International Preliminary Report on Patentability dated Mar. 18, 2016 for International Application PCT/EP2014/003380 and English translation thereof (13 pages total).
(Continued)

*Primary Examiner* — Benjamin C Lee
*Assistant Examiner* — Xuemei Zheng
(74) *Attorney, Agent, or Firm* — Staas & Halsey LLP

(57) ABSTRACT

A menu including at least one menu entry and/or a menu entry from the menu, is selected by using a menu navigation device. The device can control the vehicle by at least one head movement of a driver and includes a camera which is designed to be worn on the head of the driver to capture camera data corresponding to a field of vision of the driver, a processor unit which is configured to generate a compilation of menu entries as a function of at least one predetermined viewing direction which corresponds to the direction of a field of vision of the driver and/or a position of the driver's head, and a display for outputting the menu entries.

13 Claims, 1 Drawing Sheet

(51) Int. Cl.
 *B60K 35/00* (2006.01)
 *G06F 3/0482* (2013.01)
 *G01C 21/36* (2006.01)
 *B60W 50/10* (2012.01)
 *G02B 27/00* (2006.01)
 *G02B 27/01* (2006.01)

(52) U.S. Cl.
 CPC ..... *G01C 21/3602* (2013.01); *G01C 21/3664* (2013.01); *G02B 27/0093* (2013.01); *G02B 27/0101* (2013.01); *G02B 27/0172* (2013.01); *G06F 3/013* (2013.01); *G06F 3/017* (2013.01); *G06F 3/0482* (2013.01); *B60K 2350/1004* (2013.01); *B60K 2350/1052* (2013.01); *B60K 2350/2052* (2013.01); *B60K 2350/901* (2013.01); *G02B 2027/0138* (2013.01); *G02B 2027/0178* (2013.01)

(58) Field of Classification Search
 CPC .............. B60K 35/00; G02B 2027/017; G02B 2027/0178; G02B 2027/0141; G02B 2027/0138; G02B 2027/0187; G02B 27/02; G02B 27/017; G02B 27/0172; G02B 27/0093; G02B 2027/014; G02B 2027/0181; G06F 3/012; G06F 3/013; G06F 3/017; G06F 3/04817
 See application file for complete search history.

(56) References Cited

U.S. PATENT DOCUMENTS

| | | |
|---|---|---|
| 2002/0021407 A1 | 2/2002 | Elliott |
| 2005/0206583 A1 | 9/2005 | Lemelson et al. |
| 2009/0125233 A1* | 5/2009 | Shibasaki .......... G01C 21/3641 701/532 |
| 2011/0063425 A1* | 3/2011 | Tieman .................. B60K 37/06 348/61 |
| 2012/0194418 A1* | 8/2012 | Osterhout .......... G02B 27/0093 345/156 |
| 2012/0218295 A1* | 8/2012 | Hashikawa ............ B60K 35/00 345/629 |
| 2012/0229909 A1* | 9/2012 | Clavin ................ G02B 27/017 359/630 |
| 2012/0235902 A1 | 9/2012 | Eisenhardt et al. |
| 2013/0293530 A1 | 11/2013 | Perez et al. |
| 2013/0346085 A1* | 12/2013 | Stekkelpak ............. G10L 15/22 704/275 |
| 2014/0053105 A1* | 2/2014 | Sakata ............ H04N 21/44218 715/811 |
| 2014/0270692 A1* | 9/2014 | Suzuki ..................... H04N 9/87 386/230 |
| 2015/0012426 A1* | 1/2015 | Purves ............... G06Q 30/0623 705/41 |

FOREIGN PATENT DOCUMENTS

| | | | |
|---|---|---|---|
| DE | 102 56 589 A1 | 8/2004 | |
| DE | 10 2010 041 344 A1 | 3/2012 | |
| DE | 10 2013 005 342 A1 | 9/2013 | |
| DE | 102013005342 A1 * | 9/2013 | ............. B60R 16/02 |
| DE | 10 2013 021 834.9 | 12/2013 | |
| EP | 2 567 869 A2 | 3/2013 | |
| WO | PCT/EP2014/003380 | 12/2014 | |

OTHER PUBLICATIONS

International Search Report dated Mar. 12, 2015 from PCT Patent Application No. PCT/EP2014/003380, 6 pages.

* cited by examiner

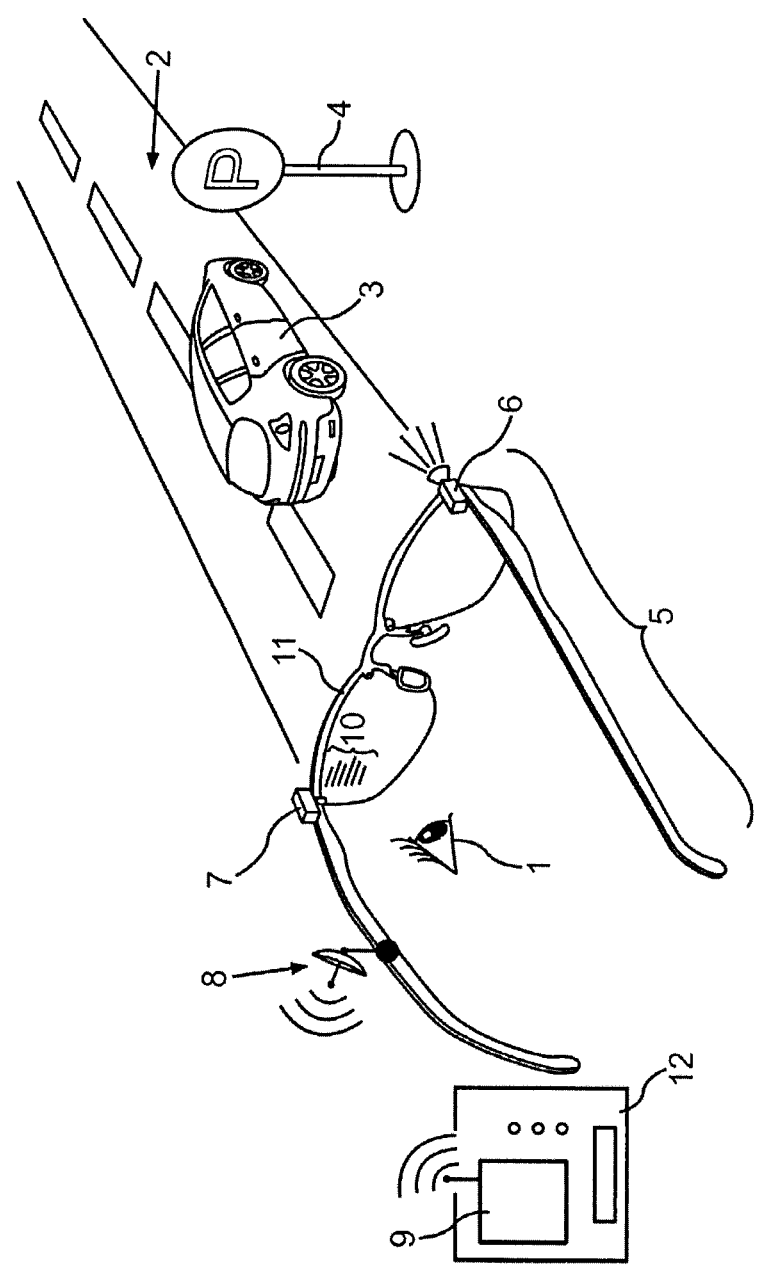

DEVICE AND METHOD FOR NAVIGATING WITHIN A MENU FOR CONTROLLING A VEHICLE, AND SELECTING A MENU ENTRY FROM THE MENU

CROSS REFERENCE TO RELATED APPLICATIONS

This application is a U.S. national stage of International Application No. PCT/EP2014/003380, filed on Dec. 16, 2014, and claims the priority benefit thereof. The International Application claims the priority benefit of German Application No. 10 2013 021 834.9 filed on Dec. 21, 2013. Both the International Application and German Application are incorporated by reference herein in their entirety.

BACKGROUND

Described herein is a method for navigating within a menu including at least one menu entry and for selecting a menu entry from the menu. In addition, described herein is a device for carrying out the method.

Modern vehicles now have a multiplicity of functions which can be actuated only using a heavily branched menu. Radio, television, navigation, e-mail and various Internet services are controlled centrally by using a rotary knob, joystick, keypad or touchpad. However, a selection from a heavily branched menu requires a high level of concentration of the driver during driving, wherein the driver's attention is severely distracted from the events on the road. In order to prevent accidents, use is made of voice control or hand gesture control, wherein in order to display the menu positionally fixed display consoles or head-up displays are used which facilitate a selection of functional options for the driver during the operator control of the vehicle.

U.S. Patent Application Publication 2012/0235902 A1 describes a head-mounted information system which has a display unit which is mounted on a frame of data glasses, wherein the frame includes at least one movement sensor which is coupled to a processor unit which is configured to convert gestures of the user's head into signals which are interpreted by the processor unit as control signals for navigation in a selection menu. Here, the intention is that the control by using head gestures will relieve the user while he is controlling different functions, and at the same time not limit his attention and vision.

U.S. Patent Application Publication 2002/0021407 A1 describes a gesture-controlled video game in which data glasses are used which are equipped with movement sensors which actuate a control unit. A processor unit converts the head gestures sensed by the movement sensors into instructions for controlling the video game.

SUMMARY

A method and a device with which intuitive and reliable control of a selection menu of a vehicle is possible is described below.

The method for navigating a menu including at least one menu entry and/or for selecting a menu entry from the menu for controlling a vehicle by uses at least one head movement of a driver. A compilation of the menu entries of the menu is made as a function of at least one of a viewing direction and/or a position of the driver's head. A particular advantage of the method is that the individual menu entries of the menu are compiled in such a way that by using the viewing direction or head movement in one direction—for example a surrounding area of the vehicle—a selection of the menu entries which are relevant in this direction or relevant at the location of the viewing direction is made. Furthermore, a targeted selection of a menu entry from the compiled menu is subsequently made by using a head gesture. The head gesture can be understood to be a continuous head movement and/or a discrete as well as a repeated head movement. Combinations of head movements can also be interpreted as a head gesture, the combinations being interpreted for the purpose of navigation or selection in the menu for controlling a vehicle. As a result, the driver's attention is not adversely affected by the driving process and at the same time a target selection of relevant menu entries—in particular driving maneuvers—is made available to the driver for selection.

In order to output the relevant driving maneuvers, the menu entries for the driver are output, according to an embodiment, on an NTED (Near-The-Eyes Display) of the driver or a HUD (Head-Up Display) or a screen display of the vehicle. In order to avoid distracting the driver's vision from the driving process, it is particularly advantageous to project the compilation of the menu entries by using an NTED. The particular advantage lies in the fact that an NTED can be integrated, for example, into data glasses which are moved along with the movement of the driver's head and can always display the relevant menu entries in the driver's field of vision. As a result, the driver's decision process is facilitated to a considerable degree since the driving process and menu entries which are dependent on the driving process or the driver's viewing direction are accessible simultaneously to the driver's view.

In an embodiment, just one menu entry may be output as a function of a direction of field of vision and/or a position of the driver's head. Such a selection merely presents the driver with the alternative of accepting or rejecting the displayed proposal. Such menu entries as menu options relate, for example, to a safe overtaking maneuver or parking maneuver or such driving maneuvers in which the driver does not have to weigh up any further considerations. In addition, single menu entries are suitable in particular in the case of an acute hazardous situation or instructions which are highly important to the driver.

In an embodiment, a compilation of the menu entries may be made as a function of a frequency of image objects appearing in the driver's field of vision. If car park signs, churches, workshops etc. were to be frequently looked at in the driver's field of vision, the compilation of the menu entries would display, for example, the closest car park, a gasoline station, a workshop or church for selection in the menu. As a result destinations of the driver can be anticipated and necessary navigation to these destinations can be initiated.

A further aspect relates to a device for carrying out a method for navigating a menu including at least one menu entry and/or for selecting a menu entry from the menu for controlling a vehicle by using at least one head movement of a driver including: a camera which is designed to be worn on the driver's head in order to capture camera data, wherein the camera data correspond to a field of vision of the driver, a processor unit which is configured to generate a compilation of menu entries which is done as a function of at least one predetermined viewing direction and/or a position of the driver's head, and a display for outputting the menu entries.

The described advantages of the method apply equally to the device which is operated therewith. Furthermore, the direction of the field of vision and/or a position and/or a movement of the driver's head can be determined from the camera data acquired with the camera, in the processor unit, for example by using an evaluation of an optical flow of a camera image. In addition, it is possible to detect image objects by using a pattern recognition process carried out in the processor unit.

In an embodiment, the device additionally has an inertial sensor which is designed to be worn on the driver's head in order to sense a position and/or movement of the driver's head.

As a result, a redundant way for a selection of the menu entries which are relevant in the viewing direction or head position or relevant at the location of the viewing direction can be made. Furthermore, a targeted selection of a menu entry from the compiled menu can be made by using a head movement.

According to an advantageous embodiment, the display has an NTED of the driver or a HUD or a screen display of the vehicle in order to output menu entries. Including the relevant menu entries considerably facilitates the driver's decision process.

According to an embodiment, the NTED of the driver is integrated into the data glasses. As a result, display of the menu is always displayed in the driver's field of vision independently of the driver's viewing direction or head position.

In an embodiment, the processor unit is configured to generate a compilation of the menu entries as a function of a frequency of predetermined image objects appearing in the driver's field of vision. On the basis of the frequency of the predetermined image objects which are identified by the processor unit it is possible to make a prediction about the driver's possible intention and, for example, offer specific navigation destinations in a compiled menu for selection, without the driver having to input the destinations individually. The predetermined image objects can be, for example, parking signs, gasoline station signs, signs indicating hotels, museums or hospitals.

The device for exchanging data may include a bidirectional communication unit which is configured to exchange data of the inertial sensor and/or of the camera and/or processor unit with a control unit of the vehicle. The communication device permits a space-saving and independent arrangement of the control unit in the vehicle as well as a mutual use of expedient data on the part of the device or the control unit of the vehicle.

A particularly compact device according to an embodiment provides that the processor unit, the inertial sensor, the camera and the display are integrated in a unit which can be worn on the driver's head. As a result, the device can be used in a particularly flexible way, for example in data glasses, wherein software can be matched specifically to the use of the device with a predetermined vehicle.

So that the menu can be used particularly efficiently, the menu entries may include driving maneuvers for autonomous driving of the vehicle and/or instructions to the driver. Driving maneuvers are to be understood, in particular, with respect to autonomous driving of the vehicle. For the selection of a driving maneuver, a series of operator control steps are taken away from the driver, thereby facilitating driving.

A further aspect relates to a vehicle having an autopilot and a device as has been described above. In this context, the vehicle is configured to carry out autonomously, by using the autopilot, driving maneuvers which have been selected by the driver. A vehicle which is provided with the device increases not only the comfort when driving but also the driving safety. Furthermore, the autopilot of the vehicle can control the vehicle more efficiently and effectively than the driver himself.

BRIEF DESCRIPTION OF THE DRAWINGS

These and other aspects and advantages will become more apparent and more readily appreciated from the following description of the exemplary embodiments, taken in conjunction with the accompanying drawing of which:

An exemplary embodiment in the single Figure shows an illustration including the device for navigating within a menu and/or for selecting a menu entry from the menu.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In this context, the single Figure shows in the illustration a device for navigating within a menu and/or for selecting a menu entry from the menu according to an embodiment, the device being operable by using the method as described herein.

The Figure illustrates a driving situation that may occur in the driver's 1 field of vision—symbolized by an eye. In the driver's 1 field of vision, a vehicle 3 which drives on a lane of a road 2 and is currently driving past a car park sign 4 is illustrated. The driver 1 views the driving situation captured in his field of vision by data glasses 5. According to an embodiment, the data glasses 5 may include a camera 6 which captures images of the driving situation which correspond to the images of the field of vision of the driver's 1 eye. Furthermore, the data glasses 5 may include an inertial sensor 7 which records movements of the data glasses 5, and transmits signals, corresponding to the movements, to a processor unit 9 via a communication unit 8. Furthermore, image data which are acquired by the camera 6 are also transmitted by the communication unit 8. In an embodiment, the processor unit 9 may also be integrated in the data glasses 5 (not shown). As a result, a particularly compact device can be manufactured. The processor unit 9 may be configured to generate a compilation of menu entries 10. In this context, the menu entries 10 are generated as a function of the driver's 1 viewing direction and/or of image data which are acquired by the camera 6 of the data glasses 5 and are transmitted to the processor unit. The driver's 1 viewing direction can be determined by using the inertial sensor 7. In an embodiment, the driver's 1 viewing direction and/or head position and/or head movement can be determined alternatively or additionally by using the camera data supplied by the camera 6. In this context, viewing directions of the driver which correspond to the orientation of the data glasses 5 worn by the driver 1 are determined by the using the processor unit 9, for example, on the basis of pattern recognition, of, for example, an A pillar, of an exterior mirror, of an internal mirror etc. In an embodiment, the viewing direction and/or the head position and/or the head movement can be determined by evaluating an optical flow of a camera image or of the camera data. Apart from this, in an embodiment, the processor unit 9 can also identify image objects, for example the vehicle 3, the parking sign 4 or the lane of the roadway 2, captured by the camera 6 of the data glasses 5, by a comparison with predetermined image data.

The menu entries 10 of the menu may be compiled as a function of the driver's 1 viewing direction or head position in such a way that the menu entries 10 correspond merely to relevant options of a driver 1 which are most probable for the driver 1 when viewing in this predetermined direction or in the present position of the head. For example, if the driver 1 looks or turns his head to the left, the menu entries 10 which correspond to the driving maneuvers: turn to the left, rotate, open a door in order to exit and the like are generated. In an embodiment, further image data which describe the driving situation, for example image data acquired in advance, over and above the driver's 1 viewing direction or head position is also evaluated. It is therefore possible to indicate a car park, hotel, hospital or a town center and the like, for example, as a function of the frequency with which traffic signs are viewed and navigation destinations which are subsequently made available to the driver 1 for selection are generated.

In the case of the data glasses 5 which are illustrated in the Figure, the menu entries 10 are projected into the field of vision of the driver 1 in an NTED as a display 11 of the data glasses 5. A resulting advantage is the simultaneous inclusion of the menu entries 10 which have been generated by the processor unit 9 in a way which matches the driver's 1 viewing direction or head position. As a result, the driving safety is automatically increased since the driver is not deflected from the driving process when searching for menu entries 10. According to an embodiment of the data glasses 5 as illustrated in the Figure, the menu entries can be selected by head gestures, wherein the inertial sensor 7 can transmit signals representing head movements to the processor unit 9 via the communication unit 8, which signals are interpreted/converted by the processor unit 9 into navigation steps by using the menu which is included in the driver's 1 field of vision in the data glasses 5, with the menu entries 10 of the menu. Accordingly, specific head movements, of a continuous or discrete type as well as different variations thereof, are understood as being navigation steps relating to specific menu entries 10 or as a selection for the activation of the respective selected menu entries 10. These "head gestures" simplify the selection of menu entries which stand, for example, for driving maneuvers and at the same time increase the driver's 1 safety and attentiveness while he is controlling his vehicle. Accordingly, the driver 1 is no longer forced to divert his gaze from the driving process in order to carry out specific driving maneuvers with one or with both hands or to initiate the maneuvers. Above and beyond the control of the vehicle, it is also possible to control components of the vehicle itself, for example a multimedia system or an on-board computer, by using the head gestures.

In an embodiment, the processor unit 9 generates, as a function of the driver's 1 viewing direction and/or of images captured by the camera 6, merely one menu entry which is included on the display 11—the NTED—to the driver 1. Such menu entries can be selected or rejected by using very simple "head gestures" or head movements. Such menu entries 10 can be used in particular in an acute hazard situation or in the case of instructions which are very important to the driver.

The processor unit 9 can also be arranged independently of the further elements of the device in the vehicle. The device can be embodied, for example, as part of the on-board computer or of a control device 12 of the vehicle.

According to an embodiment, the camera 6, the inertial sensor 7 and the communication unit 8 as well as the display 11 can be integrated in a single device, for example data glasses 5, wherein the data glasses 5 can be used in any desired vehicle which is equipped with a processor unit 9. In this context, all that is needed is adequate software which can be standardized or else matched to a specific vehicle type.

By using the device, driving safety can be improved considerably and at the same time the comfort in the vehicle can be increased.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for navigating a menu including at least one menu entry for controlling a vehicle, and/or for selecting the at least one menu entry from the menu for controlling the vehicle, based on at least one head movement of a driver, the method comprising:
   capturing camera data including actual objects appearing in a field of vision of the driver;
   determining predetermined image objects appearing in the field of vision of the driver by comparing the camera data including the actual objects with predetermined image data; and
   compiling the at least one menu entry of the menu as a function of at least one viewing direction of the driver and/or a position of the head of the driver, and as a function of a frequency with which the predetermined image objects appearing in the field of vision of the driver are viewed by the driver.

2. The method as claimed in claim 1, further comprising outputting the at least one menu entry on at least one of a near-the-eyes display of the driver, a head-up display of the vehicle, and a screen display of the vehicle.

3. The method as claimed in claim 1, further comprising outputting a single menu entry as a function of at least one of a direction of the field of vision of the driver and the position of the head of the driver.

4. The method as claimed in claim 1,
   further comprising determining the at least one viewing direction of the driver based on the camera data,
   wherein the at least one viewing direction corresponds to at least one of a direction of the field of vision of the driver and the position of the head of the driver.

5. A device for navigating a menu including at least one menu entry for controlling a vehicle, and/or for selecting the at least one menu entry from the menu for controlling the vehicle, based on at least one head movement of a driver, the device comprising:
   a camera configured to be worn on the head of the driver to capture camera data including actual objects appearing in a field of vision of the driver;
   a processor unit configured to determine predetermined image objects appearing in the field of vision of the driver by comparing the camera data including the actual objects with predetermined image data, to determine at least one predetermined viewing direction of the driver which corresponds to at least one of a direction of the field of vision of the driver and a position of the head of the driver based on the camera data of the camera, and to generate a compilation of the at least one menu entry as a function of the at least one predetermined viewing direction of the driver and/or the position of the head of the driver, and as a function of a frequency with which the predetermined image objects appearing in the field of vision of the driver are viewed by the driver; and a display configured to output the at least one menu entry.

6. The device as claimed in claim 5, wherein the vehicle includes at least one of a head-up display and a screen display, and the display configured to output the at least one menu entry is at least one of a near-the-eyes display of the driver, the head-up display, and the screen display.

7. The device as claimed in claim 6, wherein the near-the-eyes display of the driver is integrated into data glasses wearable by the driver.

8. The device as claimed in claim 5, wherein the vehicle includes a control unit, and wherein the device further comprises a bidirectional communication unit having circuitry configured to exchange data of at least one of the camera and the processor unit with the control unit.

9. The device as claimed in claim 5, further comprising an inertial sensor configured to be worn on the head of the driver to sense at least one of the position of the head of the driver and head movement of the driver.

10. The device as claimed in claim 9, wherein the vehicle includes a control unit, and wherein the device further comprises a bidirectional communication unit having circuitry configured to exchange data of the inertial sensor with the control unit.

11. The device as claimed in claim 9, wherein the processor unit, the inertial sensor, the camera and the display are integrated into a single unit wearable on the head of the driver.

12. The device as claimed in claim 5, wherein the at least one menu entry includes at least one driving maneuver for autonomous driving of the vehicle and/or instructions to the driver.

13. A vehicle system, comprising:

a vehicle, having an autopilot feature, configured to perform at least one autonomous driving maneuver selectable via at least one menu entry of a menu displayable to a driver; and a device configured to navigate the menu to control the vehicle and/or to select the at least one menu entry from the menu to control the vehicle, based on at least one head movement of the driver, the device including:

a camera configured to be worn on the head of the driver to capture camera data including actual objects appearing in a field of vision of the driver;

a processor unit configured to determine predetermined image objects appearing in the field of vision of the driver by comparing the camera data including the actual objects with predetermined image data, to determine at least one predetermined viewing direction of the driver which corresponds to at least one of a direction of the field of vision of the driver and a position of the head of the driver based on the camera data, and to generate a compilation of the at least one menu entry as a function of at least one of the position of the head of the driver and the at least one predetermined viewing direction of the driver, and as a function of a frequency with which the predetermined image objects appearing in the field of vision of the driver are viewed by the driver; and a display configured to output the at least one menu entry.

* * * * *